United States Patent [19]

Blaszczak

[11] 3,888,989
[45] June 10, 1975

[54] COMPOSITION AND METHOD FOR TREATING VIRUS INFECTIONS

[76] Inventor: Joseph W. Blaszczak, 19 Dosoris Way, Glen Cove, N.Y. 11542

[22] Filed: Aug. 9, 1972

[21] Appl. No.: 279,273

Related U.S. Application Data

[63] Continuation-in-part of Ser. Nos. 256,539, Feb. 6, 1963, abandoned, and Ser. No. 458,759, May 25, 1965, Pat. No. 3,479,335, and a continuation of Ser. No. 877,523, Nov. 17, 1969, abandoned.

[52] U.S. Cl. .............................................. 424/280
[51] Int. Cl............................................ A61k 27/00

[58] Field of Search.................................... 424/280

*Primary Examiner*—Stanley L. Friedman
*Attorney, Agent, or Firm*—Erich M. H. Radde

[57] ABSTRACT

Reaction products of ascorbic acid with formaldehyde or compounds yielding formaldehyde under the reaction conditions, especially those obtained under the reaction conditions, are highly effective agents against certain viruses. They are useful in the treatment of virus infections of animals and plants. They also impart immunity to such virus infections for about one year.

3 Claims, No Drawings

COMPOSITION AND METHOD FOR TREATING VIRUS INFECTIONS

CROSS-REFERENCES TO RELATED APPLICATIONS

The present application is a continuation-in-part of application Ser. No. 256,539, filed Feb. 6, 1963 and entitled REACTION PRODUCTS OF VITAMINS AND PROCESS OF MAKING AND USING SAME, now abandoned and of application Ser. No. 458,759, filed May 25, 1965 and entitled REACTION PRODUCTS OF RIBOFLAVIN WITH FORMALDEHYDE AND PROCESS OF PREPARING SAME, now U.S. Pat. No. 3,479,335, and a continuation of application Ser. No. 877,523, filed Nov. 17, 1969 and entitled REACTION PRODUCTS OF ASCORBIC ACID WITH FORMALDEHYDE AND PROCESS OF MAKING AND USING SAME, now abandoned.

BACKGROUND OF THE INVENTION

1. FIELD OF THE INVENTION

The present invention relates to new reaction products of formaldehyde or compounds yielding formaldehyde with ascorbic acid preferably in the presence of nicotinamide and thiamine, and preferably to reaction products of polymerized ascorbic acid with polymerized formaldehyde, and to the use of these products in the treatment of virus diseases.

2. DESCRIPTION OF THE PRIOR ART

It is known to react L-ascorbic acid with formaldehyde at a pH of about 7.5 while heating to 60°C. Thereby, carbon dioxide is split off from the carboxyl carbon of L-ascorbic acid. The resulting reaction products were not investigated for their physiological activity.

SUMMARY OF THE INVENTION

It is one object of the present invention to provide new and valuable reaction products of ascorbic acid with formaldehyde which have a high activity against certain viruses.

Another object of the present invention is to provide a simple and effective process of producing such reaction products of ascorbic acid with formaldehyde.

A further object of the present invention is to provide highly effective pharmaceutical compositions containing such reaction products of ascorbic acid with formaldehyde.

Still another object of the present invention is to provide a method of treating virus infections by the administration of such reaction products of ascorbic acid with formaldehyde.

Another object of the present invention is to provide new and valuable reaction products of polymerized ascorbic acid with polymerized formaldehyde which have a high antiviral activity. The reaction product can be considered as a precursor for non-pathogenic synthesis of viral nucleic acids as well as that of the cells which, following the treatment with said reaction product, becomes analogous to that of normal cells. When such transformation in production of the virus' nucleic acids takes place the next replication and normal nucleic acid synthesis continues in further viral generations and all pathogenic aspects of viral disease loose their ground in the host. The effectiveness of the reaction product of polymerized ascorbic acid with polymerized formaldehyde has been tested on various viruses in vitro, plants, and animals. The tests and clinical treatments indicate a true curative effect of said reaction product on all tested viruses as it is described hereinafter.

The preparation of the invention may be prepared from polymerized ascorbic acid reacting with sugars obtained from polymerization of formaldehyde in aqueous solution at a temperature close to 100°C. The therapeutic effectiveness increases directly with increase in temperature of the reaction medium. The ascorbic acid shows close relationship to sugars the formula of which is as follows:

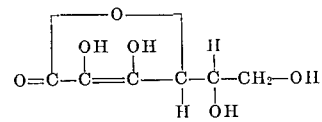

Another object of the present invention is to provide a simple and effective process of producing such reaction products of polymerized ascorbic acid with polymerized formaldehyde.

A further object of the present invention is to provide highly effective pharmaceutical compositions containing such reaction products of polymerized ascorbic acid with polymerized formaldehyde.

Still another object of the present invention is to provide a method of treating virus infections by the administration of such reaction products of polymerized ascorbic acid with polymerized formaldehyde.

Other objects of the present invention and advantageous features thereof will become apparent as the description proceeds.

According to the present invention, ascorbic acid, thiamine, and/or nicotinamide are reacted with formaldehyde or compounds which yield formaldehyde under the reaction conditions in aqueous solution.

To carry out the reaction, the reactants ascorbic acid, thiamine, and/or nicotinamide are mixed in aqueous solution preferably with an excess of formaldehyde or formaldehyde-yielding compounds such as paraformaldehyde. Preferably a concentrated aqueous formaldehyde solution, for instance, a solution containing 50% of formaldehyde is used. It is, however, also possible to employ less concentrated formaldehyde solutions, gaseous formaldehyde, or solid polymeric paraformaldehyde. According to the present invention the reaction is effected at increased temperature, preferably at a temperature exceeding 100°C. The effectiveness of the reaction products increases with increase in temperature of the reaction medium. Activators which accelerate the reaction, for instance, thiamine, nicotinamide, inorganic salts, may be added. After the reaction is completed, excess formaldehyde is removed by repeated concentration of the reaction medium by evaporation. The reaction is generally carried out at a temperature between 80°C. and 120°C. and at an acid pH.

The reaction product of ascorbic acid with formaldehyde of formaldehyde yielding compounds, preferably the reaction product of polymerized ascorbic acid with polymerized formaldehyde have proved to be highly effective against certain viruses.

DESCRIPTION OF THE PREFERRED EMBODIMENTS

The following examples serve to illustrate the present invention without, however, limiting the same thereto.

EXAMPLE 1

The reaction mixture is composed of:

| | |
|---|---|
| 100 | g. of ascorbic acid, |
| 200 | g. of paraformaldehyde, containing 95% of formaldehyde, |
| 2 | g. of thiamine hydrochloride, |
| 5 | g. nicotinic acid amide, or nicotinic acid, and |
| 200 | ml. of water. |

Vitamins $B_1$ and PP are added to increase synergistically the therapeutic effect of the reaction product. The reaction mixture, after mixing, is of milky color. It is heated to boiling and melting in an open recipient for 15 minutes. Soon after heating the reaction mixture a chemical reaction takes place and the color clarifies. Two minutes of heating causes gas evolution. After 5 minutes big bubbles appear with elimination of carbon dioxide. After 10 minutes of heating the melting reaction mixture becomes a greenish liquid. After 15 minutes of heating and cooling to room temperature, 125 g. of the resulting reaction product are obtained. After cooling to room temperature a resinous foam is formed. The reaction is dissolved in water to yield 200 cc. of solution. The solution does not freeze at a temperature of −10°C. Its density is of about 1.4, its pH-value about 2. The solution ferments at room temperature with further elimination of carbon dioxide. The process of fermentation takes place as long as a sediment of solid material is present on the bottom of the recipient and lasts for several weeks. The supernatant liquid is transparent and of orange color. This solution is used for preventive and curative treatments of diseases caused by certain viruses. One cc. of the preparation is a curative dose against influenza.

EXAMPLE 2

20 g. of ascorbic acid, 40 g. of lactose, 1 g. of thiamine hydrochloride, and 5 g. of nicotinic acid amide are mixed with 400 cc. of a 37% formaldehyde solution and the mixture is heated for 1 hour in a boiling water bath while stirring. The resulting reaction mixture is diluted with sterile distilled water to a total volume of 100 cc. 2.5 cc. of said composition are used for the treatment of virus infections such as influenza.

EXAMPLE 3

An effective preparation is produced as follows:
0.5 g. of ascorbic acid,
0.5 g. of a 50% formaldehyde solution,
0.1 g. of Ferri Carbonas Saccharatus,
0.21 g. of Calci Lactas
are mixed and diluted with water to a volume of 2 cc. The solution is boiled and evaporated to half its volume, i.e. to 1 cc. The resulting solution contains the reaction product. Complete evaporation and melting of said solution to dryness yields a solid product which can readily be redissolved in water. The aqueous solution of the reaction product has a pH of about 2.3. On shaking the aqueous solution in contact with air, emulsification takes place and the entire solution is converted into a foam. On allowing this foam to stand, the liquid is again reformed.

The aqueous solution of the reaction product (1 cc.) is diluted by adding it to 1 cc. of water. The resulting transparent solution has an orange color. To neutralize its acidity when using it therapeutically, it is further diluted by adding it to 100 cc. of milk or any other tasteful drink and the resulting dilution is then used for oral administration. For parenteral use 1 cc. of the reaction product is diluted with sterile water to a yield 10 cc. Both the oral as well as the parenteral preparation are used for the curative and preventive treatment of virus infections in animals, and plant virus diseases.

The activity of these preparations is determined by their inactivating effect on *extracellular bacteriophages*. Tests were performed as follows:

To 5 g. of the preparation of example 2 there were added 500 cc. of distilled water. The mixture was sterilized at a pressure of 15 lbs. for 20 minutes. The sterilized mixture was added to bacteriophage suspension pH. 317 in the proportion 1:1, i.e. 2 cc. of phage to 2 cc. of the mixture. The resulting mixture was kept at 25°C. for 24 hours.

Control tests were carried out with 2 cc. of phage and 2 cc. of distilled water which were mixed and kept at 25°C. After 24 hours of incubation the concentration of phage was determined on the two tubes whereby the amount of phage colonies was determined in a dilution of $10^{-7}$. It was found that the preparation of example 2 inhibited about 39% of the phage within 24 hours; about 100% inhibition was observed when added in a dilution of $10^{-6}$.

*Toxicity studies* were performed on mice, rats, rabbits, and guinea pigs. In all these studies the preparations were well tolerated and no adverse effects were detected. In these tests 1 cc. of the preparations was injected to mice without any harmful side effects.

The effectiveness of the compositions of examples 1 to 3 was demonstrated on over 60,000 animals spontaneously infected by various viruses. The tests on *influenca virus in chick embryos* showed that the embryos treated with the preparation survived the infection in contrast to the controls. Groups of 10 chick embryos infected by influenza virus A were treated with 1 cc. of the following different dilutions of the preparation of Example 1. 1 cc. of sterile water was injected in control chick embryos. The injection took place on the fourth day following the influenza infection. On the tenth day all the eggs were opened. The results of the treatment are given in the following Table.

| Dilution | No. of chick embryos treated | No. of surviving treated |
|---|---|---|
| Controls | 10 | 0 |
| 1 : 200 | 10 | 2 |
| 1 : 300 | 10 | 4 |
| 1 : 400 | 10 | 7 |
| 1 : 500 | 10 | 10 |

This test shows that a higher dose than the selective dose blocks the effectiveness of the reaction product in all test systems. In this test the selective dose is 1 cc. of the dilution 1:500. Higher doses partially or totally blocked the effectiveness of the reaction product.

The preparation also proved to be effective against artificially caused influenza in mice provided that selective doses are used.

The effectiveness of the preparations obtained according to examples 1 to 3 in the treatment of spontaneous animal virus diseases was proven by clinical observation, autopsy findings and some tests of infectivity. The temperature of the animals was determined before giving the initial dose and every 15 minutes thereafter to confirm the presence of virus infection or, in other words, the efficacy of the drug against the disease. In those cases where a susceptible virus was present, a decrease in temperature followed the initial dose within 15 minutes. The effects of the treatment have been produced within a maximum of two days. The reaction product has no beneficial activity upon bacterial infections. Therefore, it may be successfully used as a diagnostic measure of viral infections and in a method of differentiation of viral and bacterial infections. In bacterial infections no decrease in fever follows the administration of the reaction products of this invention.

Failures of the treatment were due to improper diagnosis, advanced stages of the disease, and inadequate dosage. The clinical pattern and the dosage taken under consideration during the treatment were as follows:

*Fowl pox* was treated with two doses of the preparation according to example 1, each dose containing 1 cc. of the preparation, diluted in 49 cc. of water, and given at an interval of 24 hours. The presence of cutaneous eruptions and diphtheritic membranes in the mouth warranted the diagnosis. The preparation was active against different strains of virus causing pox among other birds, such as pigeon and canary pox.

Infectious laryngotrachetis, characterized by a sudden onset and acute respiratory symptons with hemorrhagic inflammation of the upper larynx and trachea, was treated with two successive doses each of 1 cc. of the preparation of example 1 diluted with 44 cc. of water, within 24 hours.

*Infectious bronchitis*, which differs from the infectious laryngotracheitis by the absence of gross hemorrhages and the presence of edema on the tracheal mucosa and submucosa, was treated with two doses each of 1 cc. of the preparation of example 1, dilute with 44 cc. of water, within 24 hours.

*Newcastle disease*, the diagnosis of which embraced both clinical examination and histological observation, was treated with two doses each of the preparation of example 1, diluted with 29 cc. of water, within 24 hours. In 18 different outbreaks immunity tests with fully virulent Newcastle disease virus were successfully accomplished.

*Hog cholera* due to pantotropic virus, as evidenced by acute catarrh of the mucous membranes, numerous hemorrhages, nervous manifestations, and rise in temperature, was treated with two doses each of 0.8 to 1.2 cc. of the preparation according to example 1 within 24 hours. Partial failure of the treatment was due to secondary infections by Pasteurella Suiseptica and Salmonella cholerae suis.

*Canine Distemper* caused by the cytotropic virus which has a special affinity for the vascular endothelium cells of the reticuloendothelial system and epithelial cells and is characterized by fever, catarrhal inflammation of the mucous membranes, catarrhal gastroenteritis, serous lymphadenitis, pustular exanthema of the abdomen and inner surface of the thighs, was treated successfully with two doses each of 0.25 cc. to 0.50 cc. of the preparation according to example 1, within 24 hours.

The following Table 1 shows the results achieved by the above described treatment:

Table 1

| Disease | Outbreaks | Subjects | Survivors | Deaths % |
|---|---|---|---|---|
| Fowl pox | 458 | 15480 | 15270 | 0.3 |
| Infectious laryngotracheitis | 384 | 15360 | 14340 | 6.4 |
| Infectious Bronchitis | 267 | 7910 | 6200 | 21.6 |
| Newcastle disease | 325 | 14625 | 13925 | 4.8 |
| Hog cholera | 186 | 558 | 486 | 13.0 |

The effectiveness of the reaction product of ascorbic acid with formaldehyde as obtained according to example 1 was tested in mice against experimental *Hongkong A2 influenza virus*. Infective specimens of influenza A2 virus were obtained from human exudate. 20 mice were infected intranasally. The incubation period lasted about 48 hours. The first objective symptons of the disease manifested themselves in a decrease in water intake. About 60 hours later, the test group of 20 mice was divided into two groups. Ten mice were kept as controls and ten mice were treated with the reaction product. The preparation according to example 1 was diluted with 9-times its amount of water. One drop of said dilution was given intranasally to each mouse of the group which was treated while the control group did not receive this medication. A few hours thereafter, subjective symptoms of the disease, such as ruffed fur, labored breathing, rales, and inactivity appeared in the control group. The treated animals, in contrast thereto, did not show any of these symptoms, but their condition improved and they started to eat and to drink water. Four days later, nine of the treated animals regained their vigor and normal conditions. (In this test one mouse died accidentally.) In contrast thereto, all ten control animals died within 4 to 7 days.

This test proves that the reaction product of ascorbic acid with formaldehyde exerts a true curative effect in lethal influenza A2 A2 of mice.

*Immunity tests* were carried out on 8000 farm chickens divided into eight different groups, each of about 1000 chickens. The dosage varied from 0.2 cc. to 2.0 cc. of the preparation of example 1. Different doses of the preparation were given to every one of these groups during one month. On the basis of observations made during one year the final results as follows:

Table 2

| Dosage | | Number of birds of 1000 which were not infected |
|---|---|---|
| 0.25 | cc. | 760 |
| 0.5 | cc. | 880 |
| 0.75 | cc. | 960 |
| 1.0 | cc. | 800 |
| 1.25 | cc. | 700 |
| 1.5 | cc. | 570 |
| 1.75 | cc. | 350 |
| 2.0 | cc. | 120 |

It is evident that best results are not obtained with an ever increasing dose of the reaction product of polymerized ascorbic acid with polymerized formaldehyde but that two large a dose has an adverse or blocking effect.

Of course, in place of the aqueous solution of the reaction product of ascorbic acid with formaldehyde there may be used in therapy solid preparations such as tablets, pills, lozenges, and the like shaped and/or compressed preparations containing said reaction products according to the present invention. Solutions of said reaction products in liquid media such as fruit juice, milk, and others may also be administered. The new reaction products may furthermore be employed in the form of powders filled into gelatin capsules, and the like.

I claim:

1. A pharmaceutical composition for the treatment of virus infections selected from the group consisting of the fowl pox virus, the virus causing infections laryngotracheitis in animals, the virus causing infectious bronchitis in animals, the virus causing Newcastle disease, the virus causing hog cholera, the virus causing canine distemper, and the influenza A virus in animals, said composition comprising a pharmaceutical carrier and, an amount effective for treating said virus infections of the reaction product of ascorbic acid and formaldehyde, said reaction product being produced by heating and melting an aqueous solution of ascorbic acid with formaldehyde at a temperature between 80°C. and 120°C. and at an acid pH, the formaldehyde being present in a molar ratio exceeding 1 with respect to said ascorbic acid, and continuing said heating until excess formaldehyde is removed from the reaction mixture by evaporation.

2. The antiviral composition of claim 1, wherein the pharmaceutical carrier is an aqueous pharmaceutical carrier and the antiviral agent is dissolved therein.

3. A method of treating virus infections selected from the group consisting of the fowl pox virus, the virus causing infectious laryngotracheitis in animals, the virus causing infectious bronchitis in animals, the virus causing Newcastle disease, the virus causing hog cholera, the virus causing canine distemper, and the influenza A virus animals, said method consisting in administering to said infected animal the reaction product of ascorbic acid and formaldehyde at a dosage effective to treat said virus infections, said reaction product being produced by heating and melting an aqueous solution of ascorbic acid with formaldehyde at a temperature between 80°C. and 120°C. and at an acid pH, the formaldehyde being present in a molar ratio exceeding 1 with respect to said ascorbic acid, and continuing said heating until excess formaldehyde is removed from the reaction mixture by evaporation.

* * * * *

PO-1050
(5/69)

UNITED STATES PATENT OFFICE
CERTIFICATE OF CORRECTION

Patent No. 3,888,989  Dated June 10, 1975

Inventor(s) JOSEPH W. BLASZCZAK

It is certified that error appears in the above-identified patent and that said Letters Patent are hereby corrected as shown below:

Column 2, line 65: "of formaldehyde" should read -- or formaldehyde --

Column 3, Example 1: "5 g. nicotinic acid amide" should read -- 5 g. of nicotinic acid amide --

Column 3, line 30: "reaction" should read -- reaction product --

Column 4, line 10: "to a yield" should read -- to yield --

Column 5, line 33: "laryngotrachetis" should read -- laryngotracheitis --

Column 5, line 43: "dilute" should read -- diluted --

Column 6, line 43: "lethal influenza A2 A2" should read -- lethal influenza A2 infection --

Column 6, second line from the bottom: "two" should read -- too --

Signed and Sealed this nineteenth Day of August 1975

[SEAL]

Attest:

RUTH C. MASON
Attesting Officer

C. MARSHALL DANN
Commissioner of Patents and Trademarks